United States Patent [19]

Klein

[11] Patent Number: 4,531,954
[45] Date of Patent: Jul. 30, 1985

[54] ARRANGEMENT FOR FILTERING A LIQUID

[75] Inventor: Wolfgang Klein, Klingenberg, Fed. Rep. of Germany

[73] Assignee: Akzo Nv, Arnhem, Netherlands

[21] Appl. No.: 576,529

[22] Filed: Feb. 2, 1984

[30] Foreign Application Priority Data

Feb. 12, 1983 [DE] Fed. Rep. of Germany ....... 3304951

[51] Int. Cl.³ ............................................. B01D 19/00
[52] U.S. Cl. ........................................ 55/159; 55/318; 210/188
[58] Field of Search ...................... 55/159, 385 C, 171, 55/318; 200/188, 321.1

[56] References Cited

U.S. PATENT DOCUMENTS

| | | | |
|---|---|---|---|
| 3,511,031 | 5/1970 | Kettelingham et al. | 55/158 |
| 3,523,408 | 8/1970 | Rosenberg | 55/159 |
| 4,190,426 | 2/1980 | Ruschke | 55/159 X |
| 4,336,036 | 6/1982 | Leeke et al. | 55/159 |

FOREIGN PATENT DOCUMENTS

2737745 3/1978 Fed. Rep. of Germany .
3049557 7/1982 Fed. Rep. of Germany .

Primary Examiner—Charles Hart
Attorney, Agent, or Firm—Michael J. Striker

[57] ABSTRACT

An arrangement for filtering a liquid and separating of gases from the liquid has a wettable gas-impermeable microporous filter layer and a liquid-repelling gas-permeable microporous ventilating element which is formed at least as a portion of a peripheral wall of a housing.

27 Claims, 10 Drawing Figures

ARRANGEMENT FOR FILTERING A LIQUID

BACKGROUND OF THE INVENTION

The present invention relates to an arrangement for filtering a liquid and separating gases from the liquid.

Arrangements of the above mentioned general type are known in the art. In a known arrangement, filtering takes place during passage of the liquid through at least one wettable gas-impermeable microporous layer arranged in a ventilated housing, and the separation of gases and ventilation of the housing is performed via a liquid-repelling (liquid-impermeable) gas-permeable microporous ventilating element. The arrangement has a first chamber with an inlet opening for a liquid to be filtered, and a second chamber with an outlet opening for a filtered liquid, wherein the wettable gas-impermeable microporous layer is formed as a partition between the two chambers. Such a filter is disclosed, for example, in U.S. Pat. No. 4,265,762. The filtering in this filter takes place via a flat membrane, and the ventilation takes place via ventilating openings in the peripheral wall of the housing, which is covered by balls or flat material pieces of a hydrophobic material. The U.S. Pat. No. 3,013,072 discloses a dropping container with a hydrophilic filter element between the inlet opening and the outlet opening. Air is separated from the liquid to be filtered by a hydrophilic filter element and escapes into the surrounding atmosphere.

U.S. Pat. No. 4,190,426 shows a liquid filter in which the filtering is carried out via a flat membrane, and the aeration is performed via a liquid-repelling microporous membrane.

The above described filters possess the following disadvantages:

The ventilation in these filters takes place only when they have devices for ventilation extending upwardly, so that during operation of this filter they must also be placed in a proper position. The ventilating devices are technically expensive and in part very complicated, so that the manufacturing cost for this filter is very high. The cost factor plays a considerable role, since such filters can or must be frequently used only once. Finally, in these filters the filtering direction is fixed, so that the ventilating devices are arranged there only before the filter membranes.

Finally. U.S. Pat. No. 4,267,053 discloses a filter for solutions to be administered intravenously, in which the filter layer is formed by at least one porous hollow fiber. The hollow fiber is closed at one end and embedded with its other open end in a sealing compound block which is connected in liquid-tight manner with the peripheral wall of the housing. This known filter, however, does not have a device for separating of gases from the liquid or ventilating chamber at the liquid inlet side or the liquid outlet side.

SUMMARY OF THE INVENTION

Accordingly, it is an object of the present invention to provide an arrangement for filtering a liquid which avoids the disadvantages of the prior art.

In keeping with these objects and with others which will become apparent hereinafter, one feature of the present invention resides, briefly stated, in an arrangement for filtering a liquid, in which at least one portion of a peripheral wall of a housing of a first chamber and/or the second chamber is composed of a liquid-repelling (liquid-impermeable) gas-permeable microporous material.

In the sense of the present invention, the expression "a portion of a peripheral wall of the housing" means an arbitrarily dimensioned and formed part of the peripheral wall of the housing which is, however, closed (such as ring-shaped). It is formed when, for example, the housing is cut by one or two cuts extending normal or at an angle to the main flow direction of the liquid through the housing of the inventive arrangement. Along the thus defined portion of the peripheral wall of the housing, it has the gas-permeable properties over its entire circumference. In a tubular housing, the above mentioned portion of the peripheral wall has the form of a ring. The above mentioned cuts are not necessarily located in planes.

The term "liquid" is used in the present invention in connection with not only pure liquid, but also liquid mixtures as well as solutions of various liquids, of liquids and soluble solid matter such as sugar or salt, of liquid and gases, etc. This term also includes, for example, acids, electrolytes as well as liquids and solutions which contain organic or inorganic particles in non-dissolved form, also in submicroscopic region, microorganisms and the like, as well as extracts, emulsions, etc.

The wettable microporous layer for filtering the liquid can be composed of a non-metallic, for example foamed, or metallic material or material mixture, such as for example a metal-alloy, of loose particles coating one another or fixedly connected with one another for example by sintering, such as sand, glass balls, metal balls, or polymer balls, and the like, or fiber flat structures such as fabrics, wool, paper and the like. Especially advantageous are polymers or polymeric materials. In accordance with an especially advantageous embodiment of the present invention, the wettable microporous filter layer can be formed as at least a flat or hose-shaped membrane or a hollow fiber. The pore size must in each case be so small that the filtration pressure lies below the so-called blast pressure of the wettable gas-impermeable microporous layer. Only in this case is it guaranteed that no gas penetrates through the filter layer.

In accordance with another feature of the inventive arrangement, at least the peripheral wall of the housing of the first chamber is composed of a material providing the ventilation. With this embodiment, the separation of gases takes place in any position of the arrangement, even when the inventive arrangement is used so that the liquid to be filtered flows through the arrangement from below upwardly.

When the housing has the second chamber, at least a portion of it, or the entire peripheral wall of the housing, or the entire housing of the arrangement, can be formed of a liquid-repelling, gas-permeable microporous material. In such a construction the ventilation of the second chamber or the liquid in this chamber takes place in an advantageous manner. An especially advantageous embodiment has also the advantage that the separation of gases from the liquid to be filtered takes place during its flow through the filter in each of both flow directions. Such an arrangement can be used for cases when it is needed to have both flow directions.

This embodiment of the invention also involves low manufacturing expenses and provides in general lower manufacturing costs when the peripheral wall of the housing is composed of gas-permeable liquid-repelling microporous portions and gas-and liquid-tight portions.

In contrast to the arrangements known from the prior art, in the arrangement in accordance with the present invention it is also possible to provide the most effective embodiments in the sense of the separation of gases from the liquid to be filtered with relatively low expenses.

An important field of application of the inventive arrangement is filters for intravenous administering of infusion solutions or strongly foamed liquids. An infusion filter is subjected to high requirements. Since it is used only once, it must be manufacturable and transportable in a cost-economical manner. Therefore, it must have a simple technical construction and small dimensions with a predetermined high filter output. Moreover, penetration of bacteria or fungii through the gas-permeable microporous material into the infusion solution must be reliably prevented.

These requirements are satisfied in the inventive arrangement in which the microporous filter layer is formed by at least one hollow fiber closed at its one end, wherein the entire peripheral wall of the housing is composed of a gas-permeable, bacteria-tight material. It is especially advantageous when porous polypropylene is used for this purpose, especially such as is disclosed in the DE-OS No. 2,737,745. It is also especially advantageous when the peripheral wall of the housing of the inventive arrangement is tubular, since in this case it is possible to use the advantages of pipes or hoses of porous polypropylene produced as endless elements, as disclosed in the DE-OS No. 3,049,557. With the respective dimensioning of the first and second chambers in this embodiment of the inventive arrangement, it is possible to use it for both flow directions, so that liquid can flow during filtering through the hollow fibers selectively from inside outwardly, or from outside inwardly.

For protecting the gas-permeable peripheral wall of the housing, which in some cases is composed of a thin membrane, the peripheral wall or the gas-permeable portion can be surrounded by a protective grate, a closed protective casing, or a closed protective housing. These closed protective devices must be gas-permeable or provided with at least one opening, to guarantee an unobjectionable escape of gases separated from the liquid.

Depending upon the dimensions of the two chambers, it can be advantageous when the chambers are provided with displacing bodies. Thereby the volume of the liquid which is available is reduced, and therefore the contact of the liquid with the outer surface of the gas-permeable microporous peripheral wall of the housing or the portion in the inventive arrangement is improved. Such displacing bodies can be dimensioned and arranged such that, between the bodies and the housing of the arrangement, only a ring-shaped or gap-shaped flow channel for the liquid is formed. Thus, the liquid flows along the gas-permeable housing peripheral wall or portion as a layer or film, and therefore the escape of gas bubbles is performed with a considerably higher reliability.

The layers or membranes suitable for filtering the liquid can have the property with which the liquid to be filtered is wettable, for example lyophilic or hydrophilic, naturally or as a result of a special treatment. The same is true with respect to the fluid-repelling, for example lyophobic or hydrophobic, gas-permeable material for the housing, the peripheral wall of the housing or the housing/or peripheral wall portion. Suitable materials for filter membranes are for example Polyamide 6.6, Polyamide 6, cellulose, cellulose acetate or polyvinyl alcohol (PVA). Suitable materials for the liquid-repelling gas-permeable microporous part of the inventive arrangement are for example polypropylene, polyvinylidene fluoride or polytetrafluoroethylene.

The average pore size for the filter layer depends on the desired filtering effects and amounts for example to 0.2 $\mu$m for sterile filtration or 1 $\mu$m for particle filtration.

The maximum pore size of the wettable gas-impermeable microporous filter layer (membrane) can be selected so that the respective blast pressure (in other words, the pressure with which the gas penetrates through the layer and with which the liquid is expelled from the pores) is greater than the filtration pressure. The blast pressure and thereby the used filtration pressure increase with the decrease of the maximum pore of the wettable microporous filter layer.

On the other hand, the pore size of the liquid-repelling gas-permeable microporous ventilating element must be selected such that the filtration pressure is smaller than the pressure required for liquid intrusion. The pressure for the liquid intrusion, which is also identified as liquid penetration pressure, increases with the decrease of the maximum pore size of the ventilating element and with the increase of the difference of the surface tension of the liquid and the liquid-repelling gas-permeable microporous material.

These considerations for the interaction of liquids and gases with microporous materials must be taken into considerations for construction and use of the inventive arrangement.

The separation of gases from liquids with the aid of microporous liquid-repelling materials does not pose any problem when it deals with liquids with surface tension, for example water. The reduction of the difference of the surface pressure of liquid and material, for example in the event of presence of surface-pressure-reducing additives, can be compensated by reduction of the pore size of the material or by selection of a material with suitable pore size. In some cases, the surface available for ventilation must be increased. Moreover, the liquid-repelling property of a material can be influenced by high liquid temperatures or completely lost. This means that the parts of the inventive arrangement used for the separation of gases from the liquid must be selected from a material with which in the predetermined operating conditions the escape of liquid is prevented. Simple preliminary research is sufficient to determine whether the liquid-repelling property of a porous material in normal condition is also maintained in operating condition.

On the above mentioned grounds the inventive arrangement is especially suitable when during its use in the liquid no significant overpressure relative to the surrounding pressure takes place, which is the case for example in infusion filtration.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
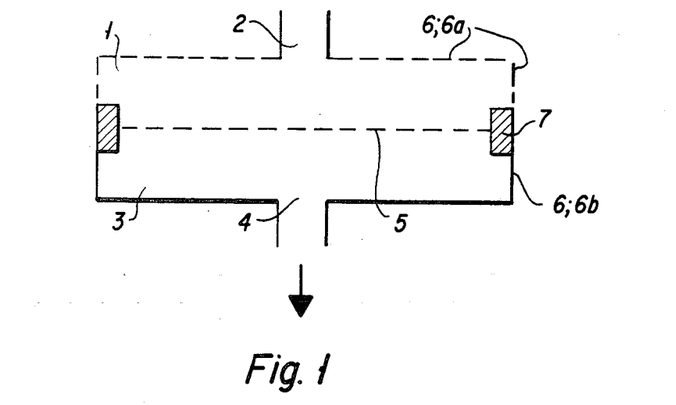
FIG. 1 is a view showing an arrangement in accordance with one embodiment of the present invention, with a flat membrane for filtering a liquid and a gas-permeable housing of a first chamber, in longitudinal section.

FIG. 1 shows an arrangement in accordance with one embodiment of the present invention which has a first chamber identified with reference numeral 1 and having an inlet opening 2 for a liquid to be filtered, and a second chamber identified with reference numeral 3 and having an outlet opening for the filtered liquid. A wettable gas-impermeable microporous flat membrane 5 is clamped in a frame 7 fixedly connected with housing parts 6, 6b and acts as a partition between both chambers 1 and 3. The housing has a gas-permeable housing portion 6a which surrounds the entire first chamber 1, and a liquid- and gas-impermeable housing part 6b which surrounds the second chamber 3. A connecting piece is identified with reference numeral 15. The main flow direction of the liquid is identified by two arrows. It is believed to be understood that in this embodiment the separation of gases from the liquid to be filtered through the liquid-repelling gas-permeable housing portion 6a of the first chamber 1 is carried out in each position of the arrangement in accordance with this embodiment. A reversal of the flow direction will lead to a situation in which the gas bubbles contained in the liquid to be filtered do not escape. An escape of the gas bubbles from the filtered liquid before leaving the chamber 1 cannot, however, take place. The filter membrane 5 or the cross section of the housing 6, 6a, 6b as considered in the flow direction can be cross-shaped, square-shaped, rectangular or of any other shape. Also, behind the membrane 5 as considered in the flow direction, a supporting grate or other means for supporting the membrane 5 can be arranged.

For simplifying the drawing, the liquid-permeable and gas-permeable microporous parts of the inventive arrangement are shown in broken lines. This is also true for the subsequent Figures, with the exception of hollow fibers, which are also microporous and liquid-permeable and whose wall is however shown in solid lines.

Figure 2:
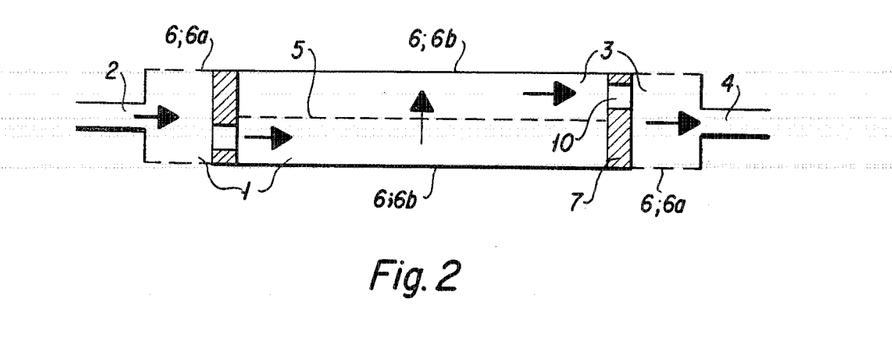
FIG. 2 is a view showing an arrangement in accordance with another embodiment of the present invention, with a flat membrane for filtering a liquid and a gas-permeable portion of a peripheral wall of a housing of the first and second chambers, in a longitudinal section.

FIG. 2 shows an arrangement in accordance with another embodiment of the present invention, in which the liquid to be filtered flows substantially normal to the main flow direction identified by the horizontal arrows, through the flat filter membrane 5. The function of the other parts of the arrangement in accordance with this embodiment are believed to be clear from the reference numerals, since these parts substantially correspond to the respective parts of the first embodiment provided with the same reference numerals. This is also true for all subsequent Figures. The cross section of the housing 6, as considered in the main flow direction, can be round, rectangular or of any other shape. The filter membrane 5 has a shape corresponding to the shape of the housing portion 6b. The clamping frame 7 is here provided with throughgoing openings 10 for the liquid.

Figure 3:
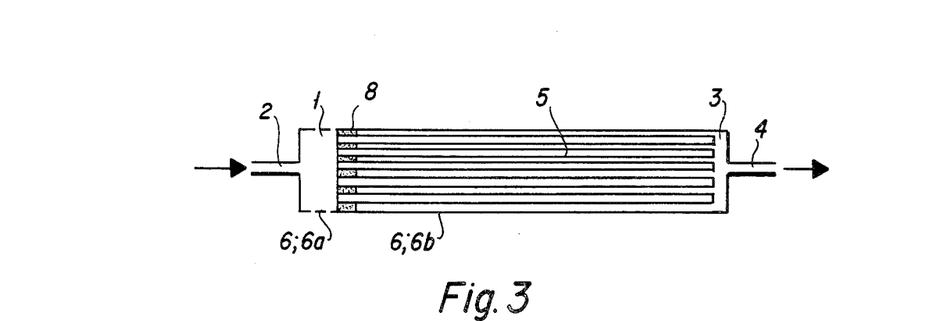
FIG. 3 is a view showing an arrangement in accordance with yet another embodiment of the present invention, with hollow fibers forming a filter membrane, wherein the hollow fibers are penetratable from inside outwardly, and with a gas-permeable peripheral wall of the housing of the first chamber, in longitudinal section.

FIG. 3 shows an arrangement in accordance with another embodiment of the present invention. In this arrangement the filter membrane 5 is formed by hollow fibers which are embedded with their open ends in a sealing compound block 8, so that the liquid at these locations can flow into the hollow fibers through the inner diameter out through the walls of the hollow fibers. The sealing-compound block 8 is firmly connected in a liquid-tight manner with the gas- and liquid-impermeable portion 6b of the housing 6. It also forms, together with the walls of the hollow fibers, the partition between the first chamber 1 and the second chamber 3. At the end facing away from the sealing-compound block 8, the hollow fibers are closed in a liquid-tight manner so as to form dead ends. The housing portion 6a which forms the casing of the first chamber 1 is composed of a gas-permeable liquid-repelling material, whereas the remaining portion 6b of the housing 6 is composed of a liquid- and gas-tight material. The arrangement in accordance with this embodiment is advantageously used for the flow direction identified by the arrow. The separation of gas bubbles from the liquid takes place before the entrance of the liquid into the hollow fibers and "clogging" of the hollow fibers by gas bubbles is prevented. The liquid flows through the wall of the hollow fibers from inside outwardly. This is especially advantageous when the wall thickness of the hollow fibers is very small and the transmembrane pressure difference is so great that, during a reverse flow direction, a collapse of the hollow fibers 5 takes place.

Figure 4:
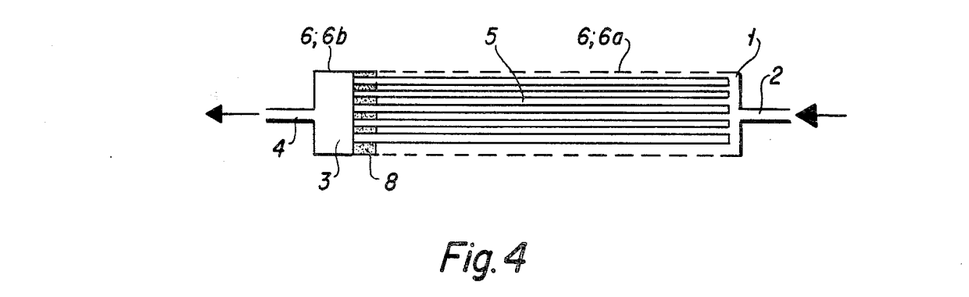
FIG. 4 is a view showing an arrangement with hollow fibers forming a filter membrane, wherein the hollow fibers are penetratable from outside inwardly, with a gas-permeable peripheral wall of the housing of the first chamber, in a longitudinal section.

The arrangement in accordance with still another embodiment shown in FIG. 4 has a flow direction which is opposite to the flow direction in the arrangement of FIG. 3. For this purpose a considerably greater portion 6a of the housing 6 (as compared with FIG. 3) is formed gas-permeable. The liquid-repelling gas-permeable housing portion 6a extends over the entire length of the first chamber 1.

Figure 5:
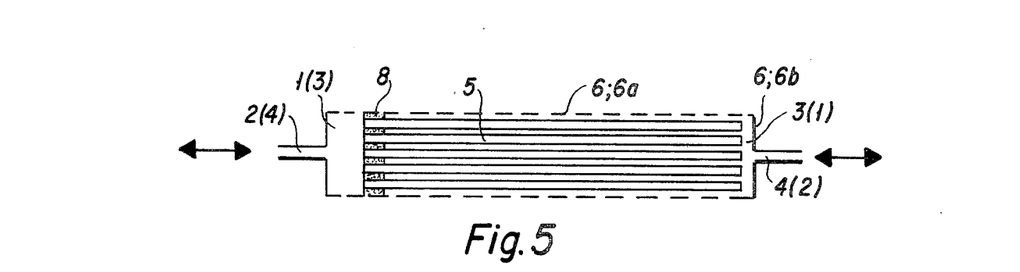
FIG. 5 is a view showing an arrangement with hollow fibers forming a filter membrane and a gas-permeable peripheral wall of a housing in a longitudinal section in accordance with still another embodiment of the invention.

FIG. 5 shows an arrangement in accordance with an especially advantageous embodiment of the invention. In this arrangement the entire housing 6a is formed of a liquid-repelling gas-permeable material, so that separation of gases from the liquid takes place both before and after the filter, and also ventilation of both chambers 1 and 3 is performed in any position of the arrangement. On the above mentioned grounds, and also because of its uncomplicated construction, the arrangement in accordance with this embodiment is recommended especially as an infusion filter. The housing portion 6a is formed advantageously as a tube or hose, so that a very cost-favorable and especially simple manufacture of the same is possible from respectively dimensioned endless tubes or hoses. Moreover, the arrangement in accordance with this embodiment operates in both flow directions.

Figure 6:
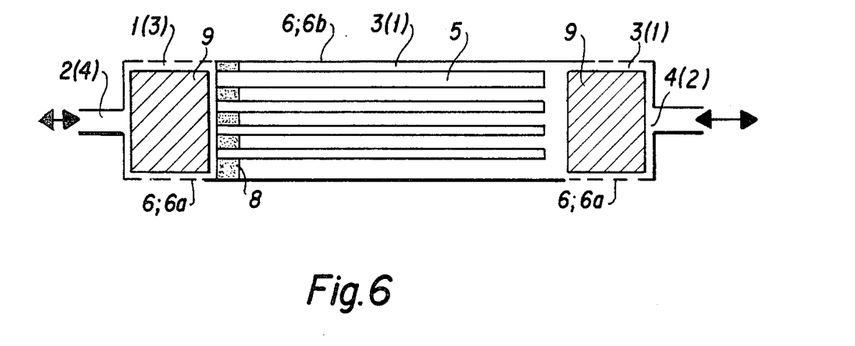
FIG. 6 is a view showing an arrangement with hollow fibers forming a filter membrane, in accordance with a further embodiment of the present invention, with displacing bodies in both chambers, a gas-permeable peripheral wall of a housing of one chamber, and a gas-permeable portion of the peripheral wall of the housing of the other chamber, in a longitudinal section.

FIG. 6 shows an arrangement in accordance with a further embodiment of the invention, which is suitable for greater liquid throughput. In this arrangement a displacement body 9 is arranged in each of the chambers 1 and 3. With the aid of the displacement body 9, the liquid passes before and after the filter in a thin layer along the porous portions 6a of the housing 6 and thereby the withdrawal of the gas bubbles is guaranteed with greater reliability. In this arrangement the filter membrane 5 is also formed by hollow fibers which are arranged and designed similarly to the arrangement of FIGS. 3–5. The arrangement of FIG. 6 can also be used for both flow directions, since here the separation of gas bubbles from the liquid to be filtered is guaranteed in both cases. In this arrangement the entire portion 6a of the chamber 1 (3) is composed of a liquid-repelling gas-permeable material, whereas the housing of the chamber 3 (1) is composed of such a material only in its portion 6a. The length of this portion 6a can be equal to or different from the length of the portion 6a of the chamber 1 (3). The lengths of both displacing bodies 9 can also be equal or different. Advantageously, they have a length corresponding to the length of the gas-permeable housing portion 6a. On the other hand, in this embodiment with the displacing bodies, the entire peripheral wall of the housing 6, or the entire housing 6, can be composed of a gas-permeable material.

The above mentioned displacing bodies 9 can also be provided when the filter membrane has the form of a flat membrane as shown in FIGS. 1 and 2, a hose membrane not shown in the drawings, or a membrane of any other shape or design. It is also possible to form at least one chamber 1 so flat or with such a small diameter that the path of the gas bubbles contained in the liquid to the porous peripheral wall of the housing or portion 6a is very small and amounts to for example only several mm, or even less.

Figure 7:
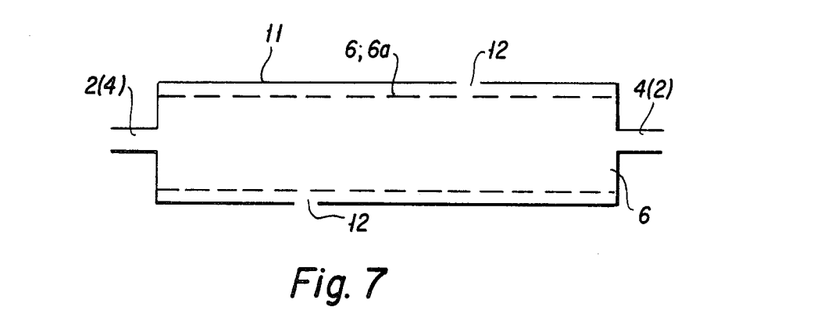
FIG. 7 is a view showing a further embodiment of the inventive arrangement, with a gas-permeable part of the arrangement surrounded by a protective housing, in a longitudinal section.

FIG. 7 shows an arrangement in which the peripheral wall or portion of the housing 6a is surrounded by a protective housing 11. For the sake of simplicity, only the housing 6 with the inlet opening 2 and the outlet opening 4 of the filter arrangement is shown here. This filter arrangement can correspond for example to the arrangement of FIG. 5. It also can correspond to the arrangement of all other embodiments shown in the other Figures, as well as to not shown embodiments of the inventive arrangement. The protective housing 11 is composed of a gas-permeable material and closed at both its ends as shown in FIG. 7. It is advantageous to provide this protective housing 11 at any location with at least one ventilation opening or pore 12. Whether the protective housing 11 protects the gas-permeable portion 6a of the housing 6 or the peripheral wall of the filter arrangement, for example from damage, it is formed so as to be rigid and resistant to the expected mechanical loads. When the protective housing 11 serves as a protective shell, for example from touching contact, dirtying and the like, it can be composed of synthetic plastic foil, a paper envelope and the like. In each case, care should be taken of the provision between the portion or the portion 6a of the filter arrangement and the protective housing 11 of such a small distance (gap), that the escape of gases penetrating through the peripheral wall of the housing of the filter arrangement can unobjectionably take place. When the gas to be separated is such that it must not be discharged into the surrounding atmosphere, the ventilating opening 12 of the protective housing 11, which in this case is gas-tight, must be connected with an arrangement for conveyance or withdrawal of such gas via a hose, a pipe, or the like.

Figure 8:
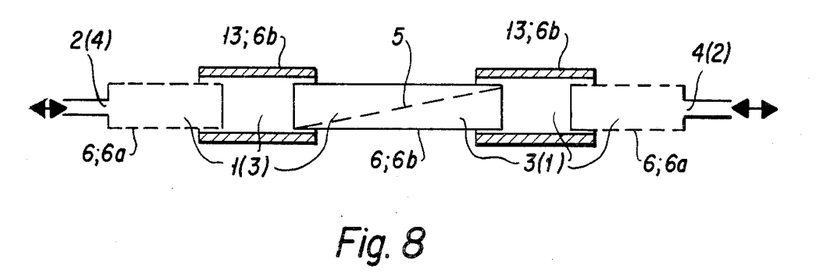
FIG. 8 is a view showing several separate parts of an arrangement in accordance with another embodiment of the invention, in an assembled form, in a longitudinal section.

FIG. 8 shows an arrangement in accordance with still a further embodiment of the invention which includes suitable liquid filter element 5, 6b with a liquid-permeable filter layer, plate or membrane 5 arranged in a gas- and liquid-impermeable housing 6b. This filter element 5, 6b is connected at both its ends by rigid or flexible connecting pieces 13 formed as pipes or hoses with ventilating elements. The ventilating elements have a gas-permeable housing 6a, as well as the inlet opening 2 and the outlet opening 4 for the liquid. This arrangement can also be used for both flow directions, as identified by oppositely directed arrows. The first chamber 1 is formed by the ventilating opening 6a, 2 arranged before the filter layer 5, the connecting piece 13 following the ventilating element, and the hollow space of the filter element 5, 6b located before the filter layer 5. The second chamber 3 is formed by the hollow chamber of the filter element 5, 6b located after the filter layer 5, the connecting piece 17 following the same, and the following ventilating element 4, 6a. The peripheral wall or housing of this arrangement is composed of the gas-permeable housing portion 6a of both ventilating elements 6a, 2 or 6a, 4, the gas- and liquid-impermeable portion 6b of both connecting pieces 13, and the gas- and liquid-impermeable portion 6b of the filter element 5, 6b. Here, a portion 6a of the housing of the first chamber 1 and a portion 6a of the housing of the second chamber 3 are composed of a liquid-repellant gas-permeable microporous material.

In this embodiment the filter layer 5 can also be composed by porous wettable hollow fibers, as in the arrangement in accordance with the embodiment of FIGS. 3–6.

Figure 9:
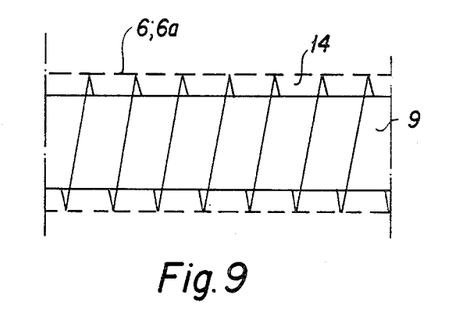
FIG. 9 is a view showing an especially advantageous embodiment of the arrangement in accordance with the present invention, with a gas-permeable portion of a peripheral wall of the housing, and displacing bodies arranged therein, in a longitudinal section.

FIG. 9 shows only that part of an arrangement in accordance with the present invention in which a displacing body 9 is arranged in the gas-permeable portion 6a of the housing 6. This embodiment is especially advantageous. The displacing body 9 has at least approximately the shape of a conveying or extruding screw. The outer diameter of the screw 9 is advantageously only insignificantly smaller than the inner diameter of the gas-permeable portion 6a. The thus formed flow passage 14 for the liquid to be filtered or the filtered liquid has a helical shape and is formed relatively flat, so that the separation of gas bubbles contained in the liquid takes place with greater reliability, and the dwell time of the liquid in this portion of the inventive arrangement is considerably reduced by the displacing body 9. Such a displacing body 9 can be arranged advantageously in the ventilating elements of the arrangement in accordance with the embodiment of FIG. 8. The screw-shaped displacing body 9 can also be arranged in the portion 6a with a non-round, for example rectangular or square cross section. The cross section of such a displacing body 9 is formed to correspond with the cross section of the portion 6a.

Figure 10:
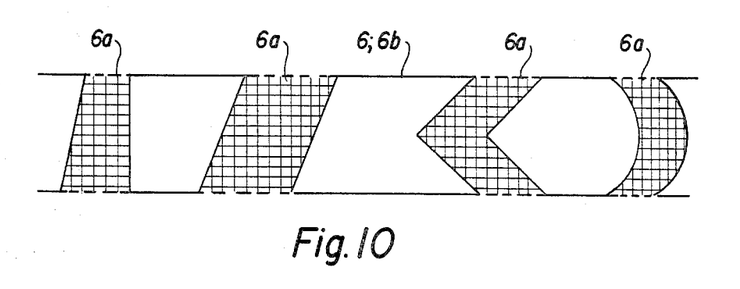
FIG. 10 is a view showing a differently designed gas-permeable portion of the peripheral wall of the housing, in a longitudinal section.

FIG. 10 shows that the present invention also embodies an arrangement in which the liquid-repelling gas-permeable microporous portion 6a of the housing 6, or the peripheral wall of the housing of the inventive arrangement, can be designed in any manner, so that the shape of the portion 6a can be provided to satisfy the respective requirements in a simple manner. For better understanding, the gas-permeable peripheral wall of the portion 6a is here sketched in with crossing-line hatching.

The arrangements in accordance with the embodiments of FIGS. 3–10 can have any cross section, as considered in the flow direction. Round or rectangular cross sections are especially advantageous. Moreover, the inlet and outlet sides of the arrangement can be provided with conventional connecting or coupling pieces for producing a hose connection or other conventional connections. They can be formed of rigid or flexible as well as transparent material, for example of glass or synthetic plastic material.

EXAMPLE

The arrangement in accordance with the embodiment of FIG. 5, which is used as an infusion filter, has the following parts with the following dimensions:

| Housing (Peripheral Wall): | |
| --- | --- |
| Length | 165 mm |
| Outer Diameter | 8.6 mm |
| Inner Diameter | 5.5 mm |
| Wall Thickness | 1.55 mm |
| Material | porous propylene such as disclosed in DE-OS 2,737,745 and DE-OS 3,049,557 |
| Average Pore Size | 0.2–0.3 $\mu$m |
| Length of the First Chamber: | 150 mm |
| Length of the Second Chamber: | 5 mm |
| Filter membrane: | |
| Number of Hollow Fibers: | 6 |
| Length of the Hollow Fibers: | 130 mm |
| Outer Diameter/Inner Diameter of the Hollow Fibers: | 1900/1500 $\mu$m |
| Wall Thickness of the Hollow Fibers: | 200 $\mu$m |
| Material | Polyamide 6 |
| Average Pore Size: | 0.2 $\mu$m |
| Filter Surface: | 35 cm$^2$ |
| Material of the Sealing-Compound Block: | PUR |

At both ends of this infusion filter, conventional coupling pieces for producing a hose connection other devices, or for direct connection of the infusion filter to other arrangements, are provided. They are composed of a transparent synthetic plastic material, so that unobjectionable operation of the infusion filter can be observed, particularly control of the filtrate to eventual still present gas bubbles is possible. The filter operates after multiple use in an unobjectionable manner in the sense of throughflow quantity, filter quality and gas separation.

It will be understood that each of the elements described above, or two or more together, may also find a useful application in other types of constructions differing from the types described above.

While the invention has been illustrated and described as embodied in an arrangement for filtering a liquid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for filtering a liquid and separating gases from the liquid, comprising a ventilatable housing having a peripheral wall, a first chamber with an inlet opening for a liquid to be filtered, a second chamber with an outlet opening for a filtered liquid; a wettable gas-impermeable microporous layer formed as partition between said chambers, said wettable gas-impermeable microporous layer being formed as a membrane composed of at least one hollow fiber; and at least a portion of said peripheral wall of said housing being composed of a liquid-repelling gas-permeable microporous material which forms a ventilating element arranged for separating a gas and ventilating said housing, said ventilating element being so positioned in at least said portion of said peripheral wall of the housing in at least one of said chambers so that separation of a gas from a liquid and withdrawal of the separated gas from said housing is performed in any position of the arrangement.

2. An arrangement as defined in claim 1, wherein said ventilating element is formed as a portion of said peripheral wall of said housing in the region of both said chambers.

3. An arrangement as defined in claim 1, wherein at least said peripheral wall of said housing of said first chamber is composed of a liquid-repelling gas-permeable microporous material.

4. An arrangement as defined in claim 1, wherein the entire peripheral wall of said housing is composed of a liquid-repelling gas-permeable microporous material.

5. An arrangement as defined in claim 1, wherein said ventilating element is composed of a liquid-repellant gas-permeable microporous material which is polypropylene.

6. An arrangement as defined in claim 1, wherein said wetable gas-impermeable microporous membrane is composed of polyamide.

7. An arrangement as defined in claim 1, wherein said wetable gas-impermeable microporous membrane is composed of at least one hollow fiber.

8. An arrangement as defined in claim 1; and further comprising a protecting device which surrounds at least said gas-permeable portion and has at least one ventilating outlet.

9. An arrangement as defined in claim 8, wherein said ventilating outlet of said protecting device is formed as a ventilating opening.

10. An arrangement as defined in claim 8, wherein said ventilating opening of said protecting device is formed as a pore.

11. An arrangement as defined in claim 1; and further comprising a displacing body arranged at least in the region of said gas-permeable portion.

12. An arrangement as defined in claim 11, wherein said displacing body is a conveying screw-shaped.

13. An arrangement as defined in claim 11, wherein said displacing body is an extruding screw-shaped.

14. An arrangement as defined in claim 1, wherein at least one of said chambers is provided with connecting means composed of a transparent material.

15. An arrangement as defined in claim 14, wherein both said chambers are provided with such connecting means.

16. An arrangement as defined in claim 14, wherein said connecting means is formed as a connecting piece.

17. An arrangement as defined in claim 14, wherein said connecting means is formed as a coupling piece.

18. An arrangement as defined in claim 1, wherein said one chamber also has a gas- and liquid-impermeable portion; and further comprising a connecting member which connects said gas-permeable portion with said gas- and liquid-impermeable portion of said one chamber.

19. An arrangement as defined in claim 18, wherein said connenting member is formed as a rigid connecting member.

20. An arrangement as defined in claim 18, wherein said connecting member is formed as a bendable connecting member.

21. An arrangement as defined in claim 18, wherein the other of said chambers also has such a gas-permeable portion and such a gas- and liquid-impermeable portion; and further comprising a further connecting member which connects said gas-permeable portion and said gas- and liquid-impermeable portion of the other of said chambers.

22. An arrangement as defined in claim 1, wherein said liquid-repelling gas-permeable microporous ventilating element and said wetable gas-impermeable microporous layer are bacteria-tight.

23. An arrangement as defined in claim 1, wherein said liquid-repelling gas-permeable microporous portion is hydrophobic, whereas said wettable gas-impermeable microporous layer is hydrophilic.

24. An arrangement as defined in claim 1, wherein said ventable gas-impermeable microporous layer is composed of Polyamide 6.

25. An arrangement as defined in claim 1, wherein said wettable gas-impermeable microporous layer is composed of Polyamide 6.6.

26. An arrangement for filtering a liquid and separating gases from the liquid, comprising a ventilating housing having a tubular peripheral wall, a first chamber with an inlet opening for a liquid to be filtered, a second chamber with an outlet opening for a filtered liquid; a wettable gas-impermeable microporous layer formed as partition between said chambers, said wettable gas-impermeable microporous layer being formed as a membrane composed of at least one hollow fiber; and at least a portion of said peripheral wall of said housing being composed of a liquid-repelling gas-permeable microporous material which forms a ventilating element arranged for separating a gas and ventilating said housing, said ventilating element being so positioned in at least said portion of said peripheral wall of the housing in at least one of said chambers so that separation of a gas from a liquid and withdrawal of the separated gas from said housing is performed in any position of the arrangement.

27. An arrangement for filtering a liquid and separating gases from the liquid, comprising a ventilatable tubular housing having a peripheral wall and composed as a whole of a liquid-repellent gas-permeable microporous material, a first chamber with an inlet opening for a liquid to be filtered, a second chamber with an outlet opening for a filtered liquid; a wettable gas-impermeable microporous layer formed as partition between said chambers, said wettable gas-impermeable microporous layer being formed as a membrane composed of at least one hollow fiber; and at least a portion of said peripheral wall of said housing being composed of a liquid-repelling gas-permeable microporous material which forms a ventilating element arranged for separating a gas and ventilating said housing, said ventilating element being so positioned in at least said portion of said peripheral wall of the housing in at least one of said chambers so that separation of a gas from a liquid and withdrawal of the separated gas from said housing is performed in any position of the arrangement.

* * * * *